US008619095B2

(12) United States Patent
Jaramillo et al.

(10) Patent No.: US 8,619,095 B2
(45) Date of Patent: Dec. 31, 2013

(54) AUTOMATICALLY MODIFYING PRESENTATION OF MOBILE-DEVICE CONTENT

(75) Inventors: David Jaramillo, Lake Worth, FL (US); Robert E. Loredo, North Miami Beach, FL (US); Jonathan Palgon, Boynton Beach, FL (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/443,341

(22) Filed: Apr. 10, 2012

(65) Prior Publication Data

US 2013/0235073 A1    Sep. 12, 2013

Related U.S. Application Data

(63) Continuation of application No. 13/416,708, filed on Mar. 9, 2012.

(51) Int. Cl.
*G09G 5/00*      (2006.01)

(52) U.S. Cl.
USPC .......................................................... 345/619

(58) Field of Classification Search
USPC .......................................................... 345/619
See application file for complete search history.

(56) References Cited

U.S. PATENT DOCUMENTS

| 6,195,640 B1 | 2/2001 | Mullaly et al. | |
| 8,401,248 B1* | 3/2013 | Moon et al. | 382/118 |
| 2004/0119714 A1 | 6/2004 | Everett et al. | |
| 2005/0030322 A1 | 2/2005 | Gardos | |
| 2005/0229200 A1 | 10/2005 | Kirkland et al. | |
| 2008/0001951 A1* | 1/2008 | Marks et al. | 345/474 |
| 2008/0297589 A1* | 12/2008 | Kurtz et al. | 348/14.16 |
| 2009/0079765 A1 | 3/2009 | Hoover | |
| 2009/0164896 A1 | 6/2009 | Thorn | |
| 2010/0103197 A1 | 4/2010 | Liu | |

(Continued)

FOREIGN PATENT DOCUMENTS

| CN | 1937813 | 3/2007 |
| CN | 102045429 | 5/2011 |
| WO | 2011150889 | 12/2011 |

OTHER PUBLICATIONS

U.S. Appl. No. 13/416,708, filed Mar. 9, 2012, Jaramillo, David et al.

(Continued)

*Primary Examiner* — Aaron M Richer
*Assistant Examiner* — Mohammad H Akhavannik
(74) *Attorney, Agent, or Firm* — DeLizio Gilliam, PLLC

(57) ABSTRACT

Some embodiments of the inventive subject matter are directed to determining a first setting(s) for presentation of content on a display of a mobile device at a distance from a user. The first setting(s) are based on analysis of characteristics associated with the mobile device. The characteristics are related to a user, an environment external to the mobile device, and content presented via the mobile device. Some embodiments are further directed to detecting a change in one or more of the characteristics in response to presentation of the content on the mobile device. The change is an event that indicates that the first setting(s) are non-optimal for presentation of the content at the distance. Some embodiments are further directed to determining second settings for presentation of content at the distance from the user based on the change in the one or more characteristics.

18 Claims, 5 Drawing Sheets

(56) References Cited

U.S. PATENT DOCUMENTS

| | | |
|---|---|---|
| 2010/0188426 A1 | 7/2010 | Ohmori et al. |
| 2010/0321519 A1* | 12/2010 | Bill .............................. 348/222.1 |
| 2011/0084897 A1 | 4/2011 | Manoharan et al. |
| 2011/0126119 A1 | 5/2011 | Young et al. |
| 2011/0148930 A1 | 6/2011 | Lee et al. |
| 2011/0279359 A1* | 11/2011 | McCarty ........................ 345/156 |
| 2012/0075166 A1* | 3/2012 | Marti et al. ..................... 345/1.1 |
| 2012/0076368 A1* | 3/2012 | Staudacher et al. ........... 382/118 |
| 2012/0256833 A1* | 10/2012 | Chiang ........................... 345/157 |
| 2012/0257035 A1* | 10/2012 | Larsen ............................. 348/78 |
| 2013/0005443 A1* | 1/2013 | Kosta et al. ...................... 463/25 |
| 2013/0057553 A1 | 3/2013 | Chakravarthula et al. |

OTHER PUBLICATIONS

"PCT Application No. PCT/CN2013/070811 International Search Report", Apr. 25, 2013, 12 pages.

"U.S. Appl. No. 13/416,708 Office Action", May 10, 2013, 22 pages.

\* cited by examiner

AUTOMATICALLY MODIFYING PRESENTATION OF MOBILE-DEVICE CONTENT

RELATED APPLICATIONS

This application claims priority benefit to U.S. patent application Ser. No. 13/416,708 filed Mar. 9, 2012.

BACKGROUND

Embodiments of the inventive subject matter generally relate to the field of mobile devices, and, more particularly, to modifying presentation of content via a mobile device.

Mobile devices, such as mobile phones, are designed to be small. Their small size has certain advantages. For example, they can be moved easily, stored in a user's pocket or purse, etc. However, their small size can also have disadvantages. For example, content presented on a display of a mobile device is harder to see than on larger displays such as televisions, computer monitors, etc. Small fonts on a small display can be especially difficult to see when a user moves the device around.

SUMMARY

Some embodiments are directed to computer program product for modifying content presented via a mobile device. The computer program product can comprise a computer readable storage medium having computer readable program code embodied therewith. The computer program code is configured to determine one or more first settings for presentation of content on a display of the mobile device at a distance from a user, wherein the one or more first settings are based on analysis of one or more of user characteristics, environmental characteristics, and content characteristics associated with the mobile device. In some embodiments, the computer program code is further configured to determine that the mobile device is the distance from the user, present content on the mobile device use the one or more first settings for presentation of the content, and detect a change in the one or more of user characteristics, environmental characteristics, and content characteristics in response to presentation of the content on the mobile device. In some embodiments, the computer program code is further configured to determine one or more second settings for presentation of content on the display of the mobile device at the distance from the user based on the change in the one or more of user characteristics, environmental characteristics, and content characteristics. Further, in some embodiments, the computer program code is further configured to present the content via the display of the mobile device in accordance with the one or more second settings. Some embodiments are further directed to a system that comprises a processing unit and a mobile device modification module operable to, via the processing unit, similarly modify content presented via a mobile device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences, and computer program products that embody techniques of the present inventive subject matter. However, it is understood that the described embodiments may be practiced without these specific details. For instance, although examples refer to determining optimal characteristics for textual content, other instances may include determining optimal characteristics for sound content, video content, and so forth. In other instances, well-known instruction instances, protocols, structures, and techniques have not been shown in detail in order not to obfuscate the description.

As stated previously, the size and portability of mobile devices can present certain challenges regarding presentation of content. The mobile device moves with the user. The environmental conditions surrounding the user, and hence the mobile device, change periodically as the user moves from room to room, inside to outside, etc. Further, user's perform activities while using their mobile devices. The movement of the mobile device and activities of a user can distract the user from the content.

Embodiments of the inventive subject matter use components of a mobile device to detect characteristics of the user, characteristics of the environment external to the mobile device, characteristics of the content, etc. and dynamically adjust presentation of content via the mobile device based on the detected characteristics. For instance, some embodiments include capturing images of a user using a camera of the mobile device, digitally processing the images to detect a change in distance or orientation of the mobile device relative to a user, and modifying presentation of text font size on a display of the mobile device based on the change in distance and/or orientation.

Figure 1A:
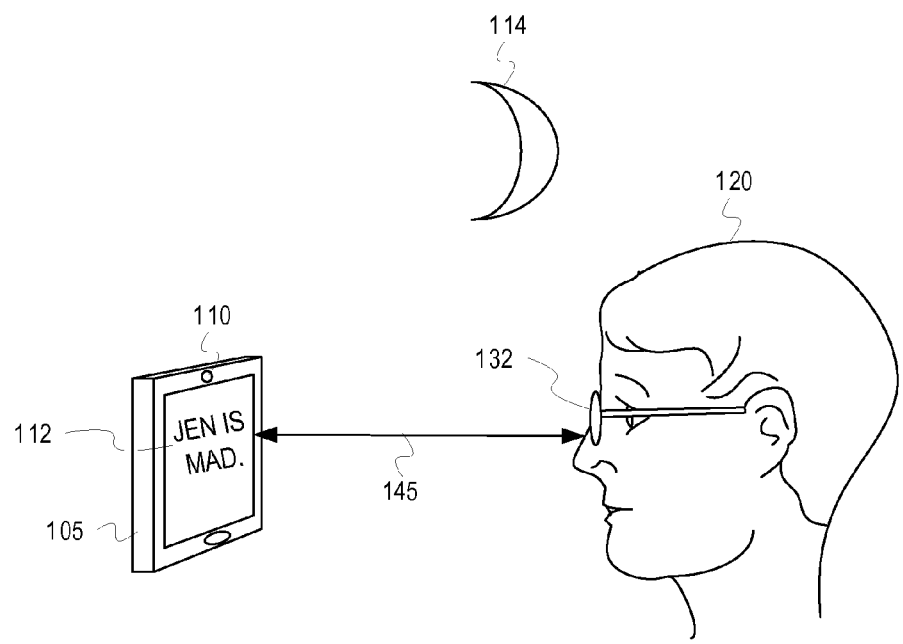
FIGS. 1A-1B are example conceptual diagrams of dynamically modifying mobile-device content.
Figure 1B:
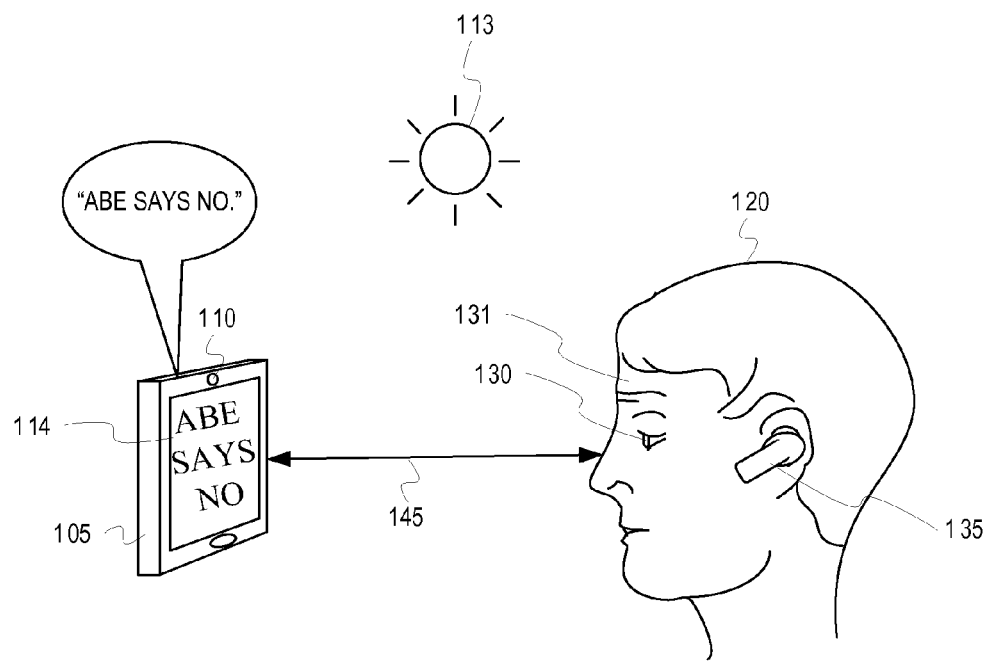

FIGS. 1A-1B are example conceptual diagrams of dynamically modifying mobile-device content. In FIG. 1, a dynamic-content modification system ("system") includes one or more mobile devices, such as the mobile device 105 (e.g., a cell phone, a smart phone, a tablet device, a personal digital assistant, etc.). The mobile device 105 has wireless communications capabilities to communicate via a communications network, such as a telephone network, a Wi-Fi network, the Internet, and so forth. The mobile device 105 presents various applications that can communicate with servers accessible via the communications network.

The mobile device 105 detects characteristics of a user 120, characteristics of an environment external to the mobile device 105, characteristics of content presented via the mobile device 105, etc. and dynamically adjusts presentation of content via the mobile device 105 based on the detected characteristics. The mobile device 105 may include, for example, a camera 110, a gyroscope, a distance sensor, a light sensor, a sound sensor, and so forth. The mobile device 105, for instance, uses the camera 110 to capture images of the user 120 to determine user characteristics, such as unique features of the user's face to identify the user 120. The mobile device 105 digitally processes the images to determine the identity of the user 120. The mobile device 105 further detects characteristics of the environment, such as a degree of light from a light source 114. The degree of light can affect an amount of potential glare on a display of the mobile device 105. The mobile device 105 presents content on the display of the mobile device 105, such as text 112, with first font characteristics. The mobile device 105 detects a distance 145 of the user 120 via digital analysis of the images of the user 120 taken by the camera 110. The mobile device 105 modifies the font characteristics, such as font size, font type, font style, font placement, font color, etc. while analyzing the facial features of the user 120. In some embodiments, the mobile device 105 modifies other content characteristics, such as background colors, background images, window sizes, aspect ratios, refresh rates, sound levels, accessibility settings, etc. In one example, the mobile device 105 presents the text 112 at a certain size and then analyzes the images of the user 120. If the user 120 does not move the mobile device 105 closer to the user's face, then the mobile device 105 determines that the font is large enough for the user to see comfortably. The mobile device 105 also detects facial expressions, patterns, size of features, etc., to detect a user's activity. For instance, if the user 120 squints to see the text 112, the mobile device 105 will detect the squinting via analysis of the images of the user 120 and adjust font size of the text 112 to be larger. The mobile device 105 also stores data within a data store internal to the mobile device 105 and/or in a network account accessible via a communications network (e.g., in an account accessible via the Internet). The mobile device 105 stores within the data store information about the lighting source 114, the distance 145 from the user 120, the user's facial expressions, the user's current activity, information about the content presented via the mobile device, etc. Some characteristics of the external environment may include light and sound levels within the environment around the mobile device, a state of the environment around the user, activity that occurs within the surrounding environment, etc. Some characteristics of the content may include, for example, a type of application through which the content is presented, a color of a background against which content is presented, a presentation type or content type (e.g., 2D versus 3D content presentation, video content versus static image content, themed game content versus business content, etc.). The mobile device 105 can also detect a change in distance and/or orientation of the mobile device 105 relative to the user 120 and, based on the change in distance and/or orientation of the mobile device 105 relative to the user 120, adjust characteristics of the content, such as the size, type, placement, etc. of the text 112 (e.g., to be larger or smaller, skewed, bold, different color, centered, scrolling, double spaced, etc.).

In FIG. 1B, at a time different from a time associated with FIG. 1A, the mobile device 105 detects a change to certain characteristics of the user 120, the environment, and/or the content presented via the mobile device 105. For example, even though the mobile device 105 may be the same distance 145 from the user 120, the mobile device 105 detects, via digital analysis of new images of the user 120 and/or the environment taken by the camera 110, that the user 120 is squinting. For instance, via analysis of the images of the user 120, the mobile device 105 detects that the eyes 130 of the user 120 are slightly closed, the user's brow 131 is furrowed, etc. Further, the mobile device 105 detects that a new light source 113 produces more light, which may result in more glare on the display of the mobile device 105. Further, the mobile device 105 detects that the user 120 has an earpiece 135, which indicates an activity performed by the user 120 that may distract the user from reading smaller text (e.g., digital analysis detects the presence of the earpiece 135). The earpiece 135 is a visual clue related to the user's current location and/or activity, such as that the user 120 is within a vehicle and/or suggesting that the user 120 is driving, walking, or performing some other hands-free task that could indicate a need for other font characteristics than for conditions associated with FIG. 1A. Further, the mobile device 105, in FIG. 1B, detects that the user is not wearing glasses 132 as in FIG. 1A. Thus, based on the analysis of the change to user characteristics, the mobile device 105 changes the font characteristics to text 114 presented at the second time associated with FIG. 1B (e.g., changes the font to a larger size, double spaces the font, etc.). In some embodiments, the mobile device 105 also enhances the presentation of the content, such as by adding sounds (e.g., by automatically determining to read text from the mobile device 105 out loud because of the conditions of FIG. 1B, as shown in FIG. 1B where the mobile device 105 reads the content). In other examples, the mobile device 105 moves the position of the content or changes its state, such as by transferring presentation of the content to a nearby display (e.g., a peripheral display connected to, or interfaced with, the mobile device 105), by turning off content, by scrolling content automatically, by zooming in on content, etc. In some embodiments, the mobile device 105 also switches modes based on conditions, such as by switching to a hand-free voice activation mode.

Figure 2:
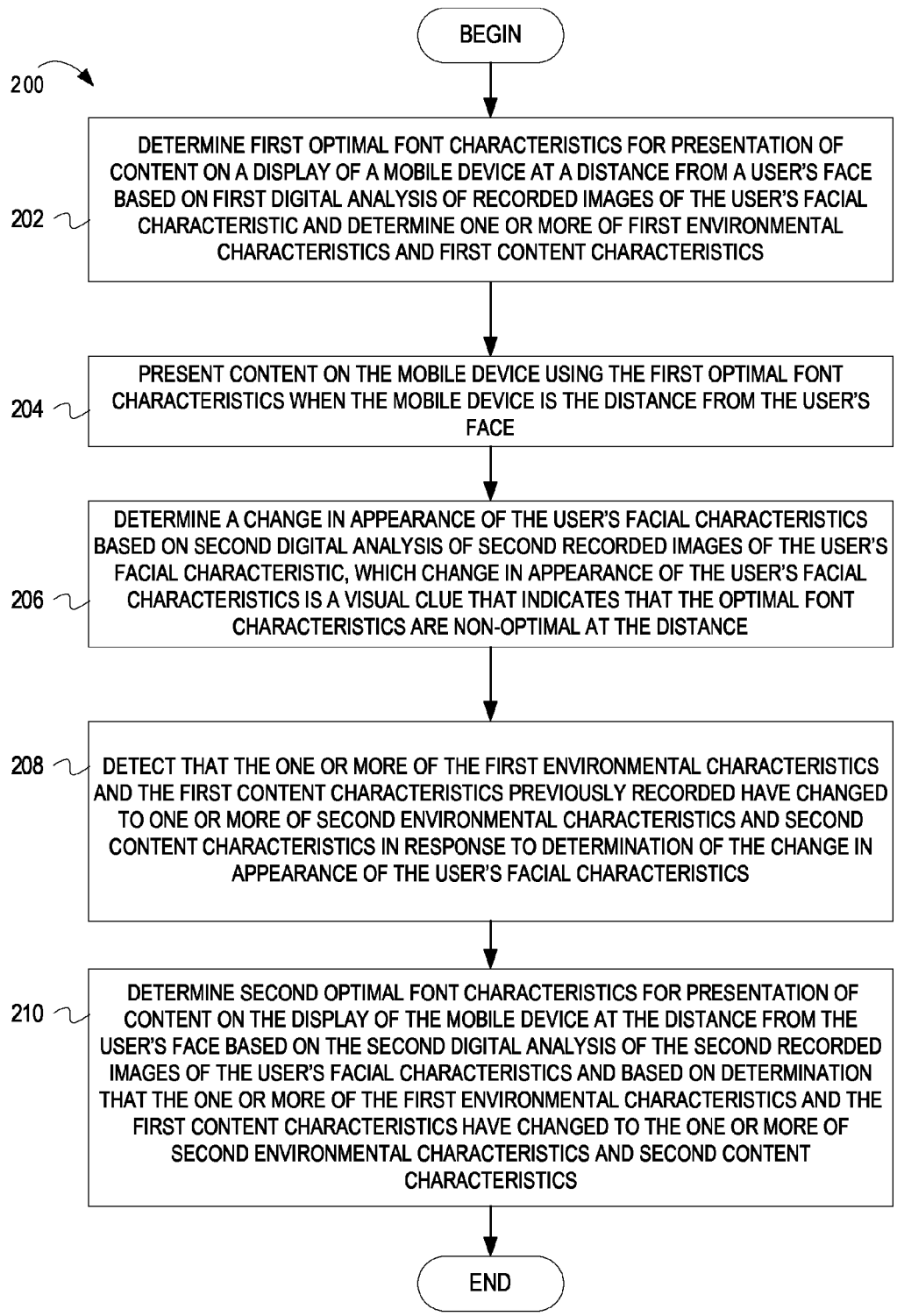
FIG. 2 is a flowchart depicting example operations for dynamically modifying font characteristics based on analysis of user characteristics given specific environmental characteristics or content characteristics.

FIG. 2 is a flowchart depicting example operations for dynamically modifying font characteristics based on analysis of user characteristics given specific environmental characteristics or content characteristics. For example purposes, operations associated with the blocks in FIG. 2 will be described as being performed by a dynamic-content modification system ("system"), which may, for example, include any or all of the elements described in FIG. 1, 3, 4, 5 or elsewhere. FIG. 2 illustrates a flow that the system can perform.

Figure 3:
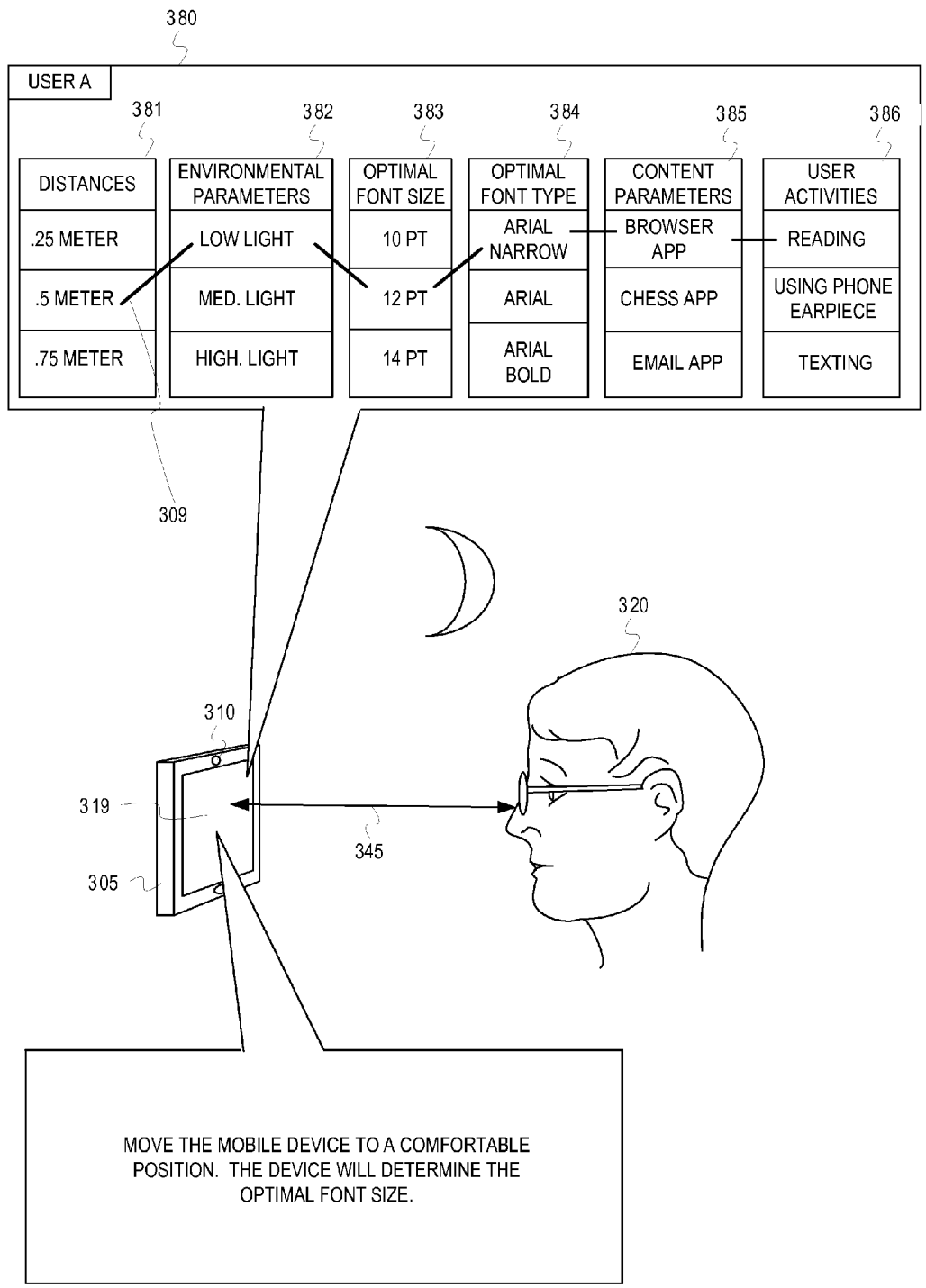
FIGS. 3-4 are example conceptual diagrams of dynamically storing and adapting optimal font characteristics based on analysis of user characteristics given specific environmental characteristics or content characteristics content.
Figure 4:
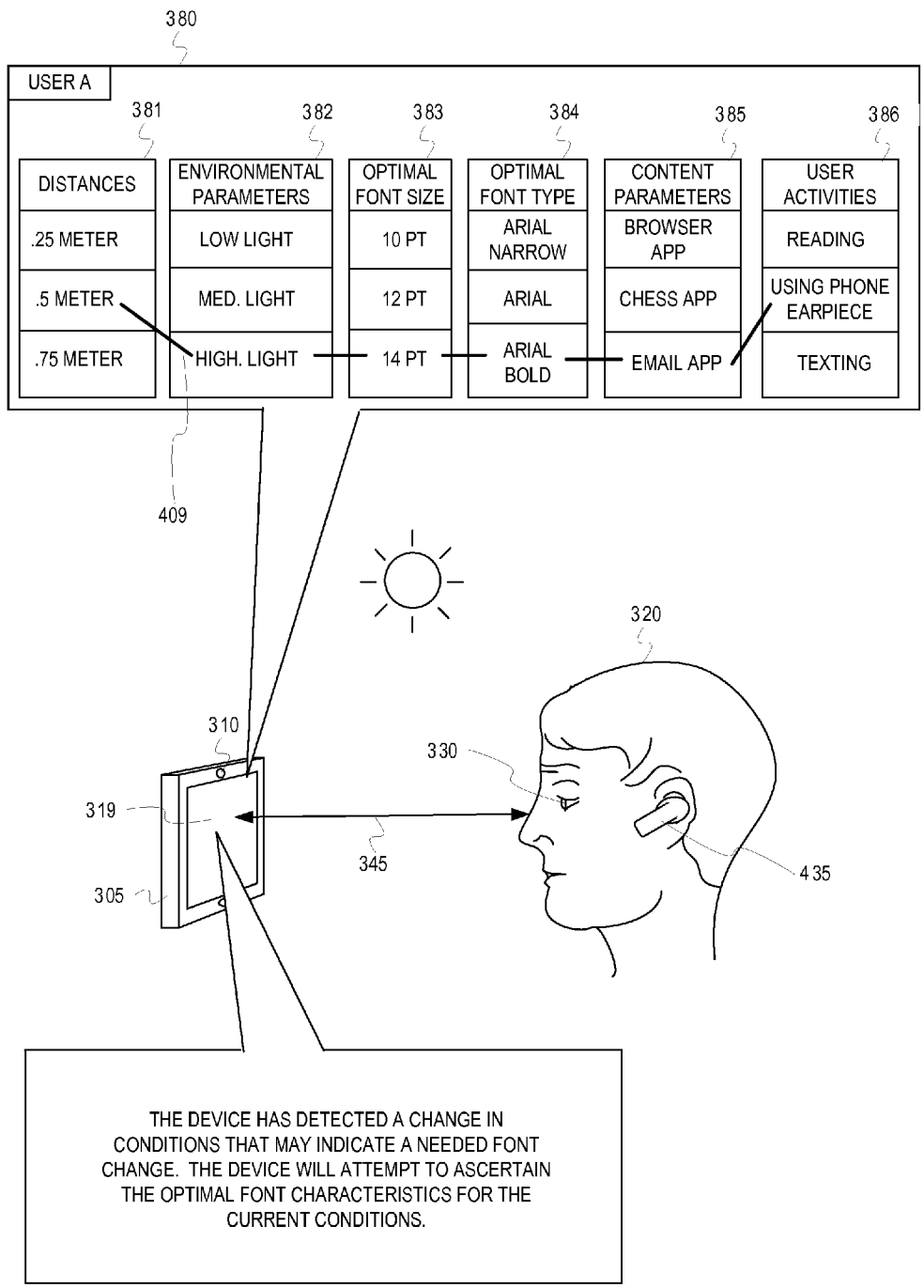

Referring to FIG. 2, the system determines first optimal font characteristics for presentation of content on a display of a mobile device at a distance from a user's face based on first digital analysis of recorded images of the user's facial characteristic and determines one or more of first environmental characteristics and first content characteristics (202). In some embodiments, the system performs a calibration to determine optimal font characteristics (e.g., font sizes, font styles, etc.) given the user characteristics (e.g., given certain distances from the user, given user identity, given user expressions, etc.). As part of the calibration, the system stores the optimal font characteristics in a data store associated with the user. FIGS. 3-4 are example conceptual diagrams of dynamically storing and adapting optimal font characteristics based on analysis of user characteristics given specific environmental characteristics or content characteristics. In FIG. 3, a mobile device 305, similar to the mobile device 105 described in FIG. 1, is part of the dynamic-content modification system. The mobile device 305 requests that a user 320 move the mobile device 305 to a comfortable position, which, in this example, is a distance 345 from the face of the user 320 (e.g., 0.5 meter).

The mobile device 305 can prompt the user 320 to calibrate the device at different distances, given different environmental and/or content conditions. The mobile device 305 determines optimal content presentation characteristics, such as optimal font characteristics, optimal backlighting levels, optimal modes, optimal power settings, optimal sound settings, optimal video play-back settings, optimal application settings, and so forth. For instance, in FIG. 3, the mobile device 305 determines optimal font characteristics based on analysis of the user characteristics and the environmental and/or content conditions. In one example, the mobile device 305 detects facial characteristics of the user 320 whose face is at the distance 345. The mobile device 305 records images of the user characteristics via a camera 310. The mobile device 305 analyzes the facial characteristics of the user 320, as detected from the images, given the conditions of the environment and/or the content at the time of calibration (e.g., given a degree of light, shadows, etc. cast upon the user 320 as digitally detected from the images). The system analyzes (e.g., via a facial recognition algorithm) and interprets the appearance of the facial characteristics that are captured via the camera 310 of the mobile device 305. In some embodiments, the mobile device 305 captures images of a size of facial features and analyzes the images to determine a change in size of the user's facial features. In another embodiment, the system detects movement, patterns, shapes, etc. of certain facial features to determine optimal content characteristics. For example, the mobile device 305 can detect when a user is squinting his or her eyes. In some embodiments, the mobile device 305 can detect a degree of squint, and a change in the degree of squinting during calibration. For example, the mobile device 305 can increase font size, presented via display 319, to a first level and detect a degree of a user's squinting. If the squinting appears to be less than before, but still indicates squinting, the system may further increase font size and then reassess a degree of the user's squinting. Based on detection of the change in the user's degree of squinting, the system can determine a degree of perceived user preference for a font size (e.g., squinting implies more preference for a larger font size). Based on the perceived user preference, the mobile device 305 can detect an optimal size for the font given a user's preference. The mobile device 305 then stores the optimal size and uses the optimal size as a baseline for comparison and as a default setting for font presentation at the given distance.

In another example, the mobile device 305 determines optimal content characteristics (e.g., an optimal size for font) based on an amount of time the user 320 is focused on a specific area of interest on the display 319 (e.g., the mobile device 305 detects an amount of time that the user's eyes remain fixed on a specific line of text on the display 319).

The mobile device 305 stores the data regarding the conditions (i.e., user, environmental and/or content conditions) in a data store 380 which is associated with the user 320. For instance, the mobile device 305 stores within the data store 380 optimal font characteristics (383 and 384) for given condition sets, distances 381 from the user 320 at which calibrations were performed, content characteristics 385 performed at times of calibration or that may occur on the mobile device 305, environmental characteristics at times of calibration or that which may occur at other times (e.g., lighting conditions 382 at times of calibration or that may occur at other times, ambient sound levels, etc.), user activities 386 that occurred at times of calibration or that may occur at other times, and so forth. Further, the system relates the data stored in the data store 380, such as via data relationships 309. The data relationships 309 can be stored in various ways, such as via data strings, via entries in relational data tables of a relational database, within data profiles, within configuration files, and so forth. The mobile device 305 can store data from different users of the mobile device 305 in different user profiles and/or different database tables. In some embodiments, the mobile device 305 is connected to a server on which multiple data stores of different users are stored, which also contain calibrated settings for optimal content presentation given certain conditions. The mobile device 305 can send data, via a communications network, to the server regarding user characteristics, environmental characteristics, content characteristics, and so forth. The server can analyze the data received from the mobile device 305 and/or cross reference against other users' calibrated settings. The server can send back to the mobile device 305 suggestions for optimal content characteristics based on the analysis and/or cross referencing performed by the server.

Returning momentarily to FIG. 2, the flow 200 continues where the system presents content on the mobile device using the first optimal font characteristics when the mobile device is the distance from the user's face (204). For, example, as in FIG. 4, at some point after a calibration of the mobile device 305, the mobile device 305 is positioned the distance 345 from the user's face. Given that the mobile device 305 is at the distance 345, the mobile device 305 reads from the data store 380 the first optimal font characteristics (e.g., the 12-point, Arial Narrow font properties). In some embodiments, the mobile device 305 detects an identity for the user 320 based on facial recognition algorithms and accesses the data store 380 that is associated with the user 320. The mobile device 305 can initially present content via the display 319 using the first optimal font characteristics. In some embodiments, after detecting the distance 345 after the initial calibration, and after reading the first optimal font characteristics from the data store 380, the mobile device 305 can detect changes to the distance 345. Based on the changes, the mobile device 305 proportionately changes the optimal font characteristics to the distance changes (e.g., the mobile device 305 changes font size to increase when the distance 345 decreases, or vice versa).

Returning again to FIG. 2, the flow 200 continues where the system determines a change in appearance of the user's facial characteristics based on second digital analysis of second recorded images of the user's facial characteristic at the second time, which change in appearance of the user's facial characteristics is a visual clue that indicates that the optimal font characteristics are non-optimal at the distance (206). The system can detect any type of event that may indicate that the optimal font characteristics are non-optimal. Detecting a change to the user's facial characteristics is just one type of event that is a visual clue. Other types of events may be related to other individuals in the vicinity of the user, an environmental settings or location, a change in content type, a communication received from the mobile device, a payment to view or access certain content, etc. The system can further detect more than one event, or combinations of events, in specific sequences, based on priority, or based on any other relationship between the events. For example, the system can detect that the one or more of the first environmental characteristics and the first content characteristics previously recorded have changed to one or more of second environmental characteristics and second content characteristics in response to determination of the change in appearance of the user's facial characteristics (208). Further, the system determines second optimal font characteristics for presentation of content on the display of the mobile device at the distance from the user's face based on the second digital analysis of the second recorded images of the user's facial characteristics and based on determination that the one or more of the first environmental characteristics and the first content characteristics have changed to the one or more of second environmental characteristics and second content characteristics (210). For example, in FIG. 4, the mobile device 305 detects that the mobile device 305 is at the distance 345 and presents content via the mobile device 305 using optimal characteristics that were detected for the first distance 345. The mobile device 305 takes second images of the user's facial characteristics (e.g., via the camera 310) and analyzes the second images to determine whether user characteristics, such as facial characteristics of the user 320, have changed in response to presentation of the content on the mobile device 305. For instance, the mobile device 305 detects a change in the user's facial expressions, such as a squinting action by the user 320, which change indicates that the first optimal font characteristics are non-optimal at the distance 345. The mobile device 305 may detect other changes to facial characteristics compared to previously recorded images, such as detection of changes in lighting on the user's face, detection that the user 320 is not wearing glasses, and detection that the user 320 is wearing a wireless earpiece 435. The mobile device 305 determines that something about the user's characteristics indicate that the previously determined optimal content characteristics are no longer optimal.

In response to detecting the change in the user characteristics, the mobile device 305 detects a change in the one or more of the environmental characteristics and the content characteristics. For example, based on the detected change to the user's characteristics, the mobile device 305 accesses the data store 380 and determines data and/or one or more previous relationships stored in the data store 380 regarding the user characteristics, the environmental characteristics and/or content characteristics that were detected at the time of the calibration. The mobile device 305 compares new data, obtained via analysis of the second images, to the data in the data store 380 and determines that the first environmental and/or content characteristics have changed to new, or different environmental and/or content characteristics (e.g., the mobile device 305 detects changes to lighting levels of the environment via digital analysis of the user's features within the second images, detects changes to location of where the user is at based on digital analysis of the second images, detects movement of the background based on digital analysis of the second images, detects ambient sounds based on audio recordings of the environment, etc.). The mobile device 305, therefore, can determine second optimal content characteristics (e.g., second optimal font characteristics) for the distance 345 based on the change to the user characteristics and the change to the one or more of the environmental characteristics and the content characteristics. The mobile device 305 stores additional data in the data store 380 regarding the changes to the user characteristics, the changes to the environmental characteristics, and/or the changes to the content characteristics. The mobile device 305 can further generate new relationship 409 that tie together the new data for future reference and as a default setting for content presentation at the distance 345 given the changed characteristics.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct an electronic device (e.g., computer, cell phone, television, set-top box, programmable data processing apparatus, etc.) to function in a particular manner, such that the instructions stored in the computer readable medium produce an article of manufacture including instructions which implement the function/act specified in the flowchart and/or block diagram block or blocks.

The computer program instructions may also be loaded onto an electronic device to cause a series of operational steps to be performed on the electronic device to produce a computer implemented process such that the instructions, which execute on the electronic device, provide processes for implementing the functions/acts specified in the flowchart and/or block diagram block or blocks.

Figure 5:
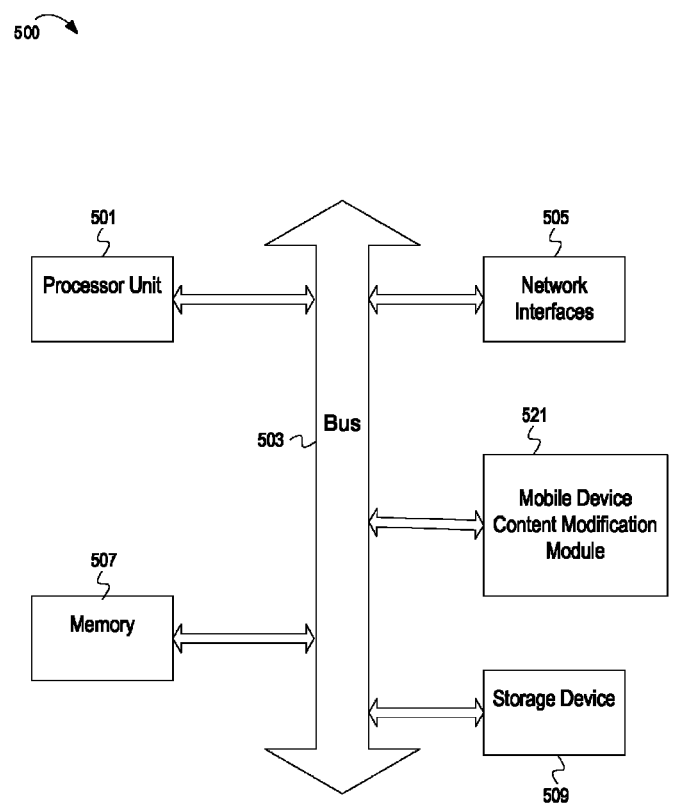
FIG. 5 depicts an example computer system.

FIG. 5 depicts an example computer system 500. The computer system 500 includes a processor unit 501 (possibly including multiple processors, multiple cores, multiple nodes, and/or implementing multi-threading, etc.). The computer system 500 includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable storage media or computer readable storage media. The computer system 500 also includes a bus 503 (e.g., PCI bus, ISA, PCI-Express bus, HyperTransport® bus, Infini-Band® bus, NuBus bus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The computer system 500 also includes a mobile device content modification module 521. The mobile device content modification module 521 can dynamically adjust mobile-device content, such as font characteristics, based on analysis of user characteristics according to environmental characteristics, content characteristics, and so forth. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501. In some embodiments, the computer system 500 is a mobile device, such as a smart-phone, a tablet, a laptop, etc. In some embodiments, the computer system 500 is connected to, or interfaced with, a mobile device. In some embodiments, the computer system 500 is configured to communicate with a mobile device via a communications network, such as via the Internet, via a telephone network, via a wireless network, etc.

While the embodiments are described with reference to various implementations and exploitations, it will be understood that these embodiments are illustrative and that the scope of the inventive subject matter is not limited to them. In general, techniques for dynamically modifying mobile-device content as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer program product for modifying content presented via a mobile device, the computer program product comprising:
  a non-transitory computer readable storage medium having computer readable program code embodied therewith, the computer readable program code comprising:
  computer readable program code configured to,
    determine one or more first settings for presentation of content on a display of the mobile device,
    present the content on the mobile device using the one or more first settings for presentation of the content,
    after presentation of the content, via analysis of one or more images that depict a user of the mobile device and a background associated with the user, detect a visible condition of an environment depicted in the background that has an appearance of movement in the background,
    access a data store associated with the mobile device, wherein the data store indicates one or more activities that, if performed, would distract the user from the content, wherein the data store includes a description of an activity from the one or more activities indicated in the data store,
    detect a value associated with the visible condition of the environment depicted in the background, wherein the value associated with the visible condition of the environment is associated with the description of the activity,
    determine, based on the detection of the value associated with the description of the activity in the data store, that the user performs the activity,
    select from the data store one or more second settings for presentation of the content on the display of the mobile device, wherein the one or more second settings are associated with the value associated with the visible condition of the environment depicted in the background, and
    present the content via the display of the mobile device in accordance with the one or more second settings.

2. The computer program product of claim 1, wherein the computer readable program code is configured to detect a degree of change in appearance of one or more facial features of the user, and wherein the computer readable program code configured to determine the one or more second settings for presentation of the content on the display of the mobile device is configured to select at least one of the one or more second settings configured to set a degree of size of the content proportional to the degree of change in the appearance of the facial feature.

3. The computer program product of claim 1, wherein the computer readable program code configured to detect the visible condition of the environment depicted in the background that has the appearance of the movement in the background is configured to, one or more of, detect activity that occurs to one or more individuals in an environment around the user, detect movement of one or more individuals in an environment behind the user, and detect that the user is inside a vehicle.

4. The computer program product of claim 1, wherein the computer readable program code is configured to determine the one or more first settings for presentation of the content is based on analysis of one or more additional images taken via the mobile device prior to presentation of the content.

5. The computer program product of claim 4, wherein the computer readable program code is further configured to:
generate the one or more first settings based on the analysis of the one or more additional;
store the one or more first settings in the data store;
detect an identity of the user via facial recognition of the user via the analysis of the one or more images;
generate the one or more second settings based at least partially in response to detection of the identity of the user and based on the appearance of the movement in the background; and
store the one or more second settings in the data store.

6. The computer program product of claim 1, wherein the computer readable program code is configured to, based on the appearance of the movement associated with the background, detect one or more of movement of the user relative to the background and movement of one or more objects depicted in the background.

7. The computer program product of claim 6, wherein the computer readable program code configured to detect the one or more of the movement of the user relative to the background and the movement of the one or more objects depicted in the background is configured to one or more of detect that the user is texting on the mobile device, detect that the user is performing a hands-free task, detect that the user is talking on the mobile device, detect that the user is using a telephonic earpiece with the mobile device, detect that the user is removing prescription eyeglasses, detect that the user is driving a vehicle, and detect that the user is walking.

8. The computer program product of claim 1, wherein the computer readable program code configured to determine that the user performs the activity that distracts the user from viewing the content is configured to determine, from the change of the appearance of the background, that the user is in a location where the user can perform the activity.

9. The computer program product of claim 1, wherein the computer readable program code configured to present the content via the display of the mobile device in accordance with the one or more second settings is configured to one or more of move a position of the content on the display, scroll content automatically via the display, activate a zooming feature of the content via the display, change back lighting levels of the display, change power settings of the display, switch to a voice activation mode of the mobile device, add sounds to presentation of the content via the mobile device, present an audio version of text that is presented on the display of the mobile device, transfer presentation of at least a portion of the content to a second display, and turn off presentation of at least a portion of the content.

10. A system comprising:
a processing unit; and
a mobile device content modification module operable to, via the processing unit,
present content on a mobile device using one or more first settings for presentation of the content,
in response to presentation of the content on the mobile device, analyze one or more recorded images that depict a user of the mobile device and a background associated with the user,
detect, based on analysis of the one or more recorded images, a visible condition of an environment depicted in the background that has an appearance of movement relative to the background,
access a data store associated with the mobile device, wherein the data store indicates one or more activities that, if performed, would distract the user from the content, wherein the data store includes a description of an activity from the one or more activities indicated in the data store,
detect a value associated with the visible condition of the environment depicted in the background, wherein the value associated with the visible condition of the environment is associated with the description of the activity,
determine, based on the detection of the value associated with the description of the activity in the data store, that the user performs the activity, wherein the activity, when performed, distracts the user from perceiving the content when presented using the one or more first settings,
select from the data store one or more second settings for presentation of the content via the mobile device, wherein the one or more second settings are associated with the value, and
present the content via the mobile device in accordance with the one or more second settings.

11. The system of claim 10,
wherein the activity comprises one or more of talking on the mobile device, texting on the mobile device, walking, driving, and performing a hands-free task.

12. The system of claim 10, wherein the mobile device content modification module is operable to detect that the activity occurs by one or more individuals other than the user within the environment.

13. The system of claim 10, wherein the mobile device content modification module operable to determine the one or more first settings for presentation of the content is based on first digital analysis of one or more additional recorded images taken via the mobile device and wherein the mobile device content modification module is operable to detect, based on second digital analysis of the one or more recorded images taken via the mobile device, movement of the background relative to the user.

14. The system of claim 13, wherein the wherein the mobile device content modification module is further operable to:
generate the one or more first settings based on the first digital analysis;
store the one or more first settings in the data store;
detect an identity of the user via facial recognition of the user via the second digital analysis;
generate the one or more second settings based on the second digital analysis of the one or more recorded images at least partially in response detection of the identity of the user and based on the detection that the user performs the activity; and
store the one or more second settings in the data store.

15. A computer program product comprising:
a non-transitory, computer readable storage medium having computer readable program code embodied therewith, the computer readable program code configured to,
present content via a mobile device,
analyze an appearance of a user and a background depicted in one or more images obtained via the mobile device, based on analysis of the appearance of the user and the background, detect a visible condition of an environment depicted in the background that has an appearance of movement, access a data store associated with the mobile device, wherein the data store indicates a description of an activity that, if performed, would distract the user from presentation of the content via the mobile device, detect a value in the data store associated with the visible condition of the environment depicted in the background, wherein the value associated with the visible condition of the environment is associated with the description of the activity, select from the data store one or more settings for presentation of the content via the mobile device, wherein the one or more settings are associated with one or more of the value and the description of the activity in the data store, and change the presentation of the content according to the one or more settings.

16. The computer program product of claim 15, wherein prior to analyzing the appearance of the user and the background, the content is presented in a visual format from a visual output mechanism of the mobile device, and wherein the computer readable program code configured to change the presentation of the content is configured to one or more of change the presentation of the content in the visual format to an audio format presented via an audio output mechanism associated with the mobile device and change the mobile device to a voice activation mode.

17. The computer program product of claim 15, wherein the computer readable program code configured to detect the visible condition of the environment depicted in the background that has the appearance of movement is configured to detect one or more of movement of the user relative to the background, movement of one or more objects depicted in the background, and movement of one or more individuals in the background other than the user.

18. The computer program product of claim 15, wherein the computer-readable program code is configured to one or more of determine that the user is talking on the mobile device, determine that the user is texting on the mobile device, determine that the user is walking, determine that the user is driving, and determine that the user is performing a hands-free task.

* * * * *